United States Patent
VandenBerghe

[19]

[11] Patent Number: 5,949,146
[45] Date of Patent: Sep. 7, 1999

[54] CONTROL TECHNIQUE FOR A LEAN BURNING ENGINE SYSTEM

[75] Inventor: Terry VandenBerghe, La Rochelle, France

[73] Assignee: Cummins Engine Company, Inc., Columbus, Ind.

[21] Appl. No.: 08/887,464

[22] Filed: Jul. 2, 1997

[51] Int. Cl.⁶ ..................................................... F11D 15/10
[52] U.S. Cl. .................. 290/40 R; 123/350; 123/339.19
[58] Field of Search ............................... 290/40 R, 40 A, 290/40 B, 40 C; 123/331, 333, 339.1, 339.14, 339.19, 350

[56] References Cited

U.S. PATENT DOCUMENTS

| | | | |
|---|---|---|---|
| 3,789,816 | 2/1974 | Taplin et al. | 123/119 R |
| 3,984,701 | 10/1976 | Pieper | 307/232 |
| 4,015,572 | 4/1977 | Leshner et al. | 123/139 AW |
| 4,153,013 | 5/1979 | Bianchi et al. | 123/32 EA |
| 4,197,767 | 4/1980 | Leung | 74/860 |
| 4,489,690 | 12/1984 | Burkel et al. | 123/419 |
| 4,502,442 | 3/1985 | Takakuwa et al. | 123/417 |
| 4,513,721 | 4/1985 | Ina et al. | 123/478 |
| 4,562,818 | 1/1986 | Kohama et al. | 123/478 |
| 4,633,093 | 12/1986 | Otobe et al. | 290/40 R |
| 4,736,724 | 4/1988 | Hamburg et al. | 123/435 |
| 4,867,127 | 9/1989 | Quirchmayr et al. | 123/527 |
| 4,998,518 | 3/1991 | Mitsumoto | 123/306 |
| 5,107,815 | 4/1992 | Van Duyne | 123/435 |
| 5,165,271 | 11/1992 | Stepper et al. | 73/116 |
| 5,445,128 | 8/1995 | Letang et al. | 123/436 |
| 5,458,102 | 10/1995 | Tomisawa et al. | 123/435 |
| 5,460,134 | 10/1995 | Ott et al. | 123/476 |
| 5,469,823 | 11/1995 | Ott et al. | 123/414 |
| 5,505,177 | 4/1996 | Herdin et al. | 123/435 |
| 5,515,828 | 5/1996 | Cook et al. | 123/436 |
| 5,533,492 | 7/1996 | Willey et al. | 123/681 |
| 5,552,640 | 9/1996 | Sutton et al. | 290/40 B |
| 5,553,575 | 9/1996 | Beck et al. | 123/198 |
| 5,560,338 | 10/1996 | Herdin et al. | 123/435 |
| 5,575,266 | 11/1996 | Iida | 123/680 |
| 5,606,960 | 3/1997 | Takahashi et al. | 123/684 |
| 5,614,768 | 3/1997 | Tanaka | 290/40 C |
| 5,622,053 | 4/1997 | Freen | 60/603 |
| 5,694,899 | 12/1997 | Chvatal et al. | 123/350 |
| 5,751,069 | 5/1998 | Rajashekara et al. | 290/40 C |
| 5,762,045 | 6/1998 | Pockstaller et al. | 123/425 |
| 5,765,372 | 6/1998 | Mitobe et al. | 60/301 |
| 5,832,895 | 11/1998 | Takahashi et al. | 123/350 |

FOREIGN PATENT DOCUMENTS

0 727 574 A1  8/1996  European Pat. Off. .

*Primary Examiner*—Nestor Ramirez
*Assistant Examiner*—Nicholas Ponomarenko
*Attorney, Agent, or Firm*—Woodard, Emhardt, Naughton, Moriarty & McNett

[57] ABSTRACT

A technique is disclosed for operating an internal combustion engine near the lean burn limit. This technique includes sensing a first characteristic corresponding to a mean effective pressure of the engine and a second characteristic corresponding to fluid pressure in the intake manifold. An engine performance criterion is established as a function of the first and second characteristics. This performance criterion corresponds to an observed emission rate of a pollutant from the engine. A target for the performance criterion is selected which corresponds to lean burn operation of the engine with a limited emission rate of a pollutant. A mixture of air and fuel provided for combustion by the engine is controlled in accordance with the performance criterion and the target. The performance criterion may correspond to: ((BMEP×IMT)/IMP). Furthermore, this technique may be applied to lean burning, gaseous-fueled engines configured to drive an electrical power generator.

37 Claims, 5 Drawing Sheets

CONTROL TECHNIQUE FOR A LEAN BURNING ENGINE SYSTEM

BACKGROUND OF THE INVENTION

The present invention relates to the regulation of internal combustion engine operation, and more particularly, but not exclusively, relates to controlling engine operation near the lean burn misfire limit.

In efforts to reduce harmful exhaust emissions from internal combustion engines, it has been discovered that exhaust pollutants, such as Nitrogen Oxides (NOx), generally decrease when a lean mixture of air and fuel is provided to the engine for combustion. U.S. Pat. Nos. 5,107,815 to Van Duyne and 4,562,818 to Kohama et al. provide representative examples of attempts to address harmful exhaust emissions.

Typically, lean burning operation of an engine is limited by misfiring, which results when the air/fuel mixture provided to the engine becomes too lean. Misfires generally undermine smooth, reliable, and efficient engine operation. Therefore, it is often desirable that the air/fuel mixture be regulated to provide a minimum of exhaust pollutants, while still reliably avoiding misfires.

One attempt to regulate the air/fuel mixture is based on the amount of oxygen detected in the engine exhaust stream with an oxygen sensor. Unfortunately, lean burn regulation in accordance with the amount of residual oxygen in engine exhaust is somewhat limited. Indeed, although the measurement of residual oxygen may be utilized to detect misfires under some circumstances, this approach is typically ineffective as an indicator of proximity to the lean burn misfire limit.

Also, oxygen sensors suitable for exhaust gas measurement are generally too inaccurate to maintain engine operation close to the lean misfire limit. In addition, oxygen sensors tend to drift with age and are susceptible to humidity variations, which often limits effectiveness in lean burn control systems. Because of these constraints, lean burn systems based on an oxygen sensor ordinarily select an operating point that is not as lean as would otherwise be desired.

Thus, an alternative approach to controlling lean burning engines is needed. The potential pollution reduction from an improved lean burn control of large, gaseous-fueled internal combustion engines, such as the type used to drive electric power generators, would be particularly advantageous. The present invention satisfies these needs and provides other significant advantages.

SUMMARY OF THE INVENTION

The present invention relates to control of lean burning engine systems. Various aspects of the invention are novel, non-obvious, and provide various advantages. While the actual nature of the invention covered herein can only be determined with reference to the claims appended hereto, certain features which are characteristic of the preferred embodiment disclosed herein can be described briefly.

One feature of the present invention is an internal combustion engine having an intake manifold. A control characteristic is established for the engine corresponding to: (BMEP/IMP); where BMEP represents brake mean effective pressure of the engine and IMP represents the fluid pressure in the intake manifold. The engine is operated and the control characteristic is monitored to regulate engine operation as a function of a predetermined misfire threshold of the engine.

This control characteristic may be used to dynamically determine proximity to the misfire threshold and correspondingly minimize pollutant emissions. For gaseous-fueled engines, it has been found that this control characteristic is relatively insensitive to compositional variations common to gaseous fuels—especially variation in methane number, density, and Lower Heating Value (LHV) of natural gas (where LHV is indicative of the energy content of the fuel and is typically described in units of kilojoules per kilogram). The control characteristic may be further established according to: ((BMEP×IMT)/IMP); where IMT represents manifold temperature. In one variation of this form of the invention, ((BMEP×IMT)/IMP) is further determined as a function of rotational speed of the engine.

Another feature of the present invention is an internal combustion engine having an intake manifold which is coupled to a controllable valve. This valve is controlled to adjust a mixture of air and fuel provided to the engine for combustion. Also included is a first sensor generating a first signal corresponding to torque produced by the engine, and a second sensor generating a second signal corresponding to intake manifold pressure. A controller is responsive to the first and second signals to generate an observed engine performance signal as a function of a ratio of the torque and intake manifold pressure. The controller also generates a target engine performance signal representing a desired state of the observed engine performance signal. This target engine performance signal corresponds to a lean burn operating criterion of the engine. The controller generates a valve signal corresponding to a difference between the observed and target performance signals. The valve responds to the valve signal to control the mixture of air and fuel and correspondingly regulate lean burn operation of the engine.

In yet another feature of the present invention, an electric generator is driven by an internal combustion engine. A characteristic of the generator corresponding to torque produced by the engine is sensed, and an engine performance criterion is determined as a function of the sensed characteristic. A target for the engine performance criterion is selected which corresponds to a level of a pollutant emitted from the engine. A combustible mixture of air and fuel provided to the engine is adjusted in accordance with the performance criterion and the target to regulate emission of the pollutant. In one embodiment, the sensed characteristic is provided by monitoring the electrical load on the generator.

Accordingly, it is one object of the present invention to control a lean burning engine system.

It is another object of the present invention to provide a system and method to control lean burning engines as a function of torque (or BMEP), and intake manifold pressure.

It is a further object to control lean burn operation of gaseous-fueled engines near the misfire limit with reduced sensitivity to variations in composition of the associated gaseous fuel.

It is still another object of the present invention to control a lean burning engine driving an electrical power generator as a function of electrical power output of the generator.

It is an additional object of the present invention to provide a lean burning engine control technique for maintaining NOx emissions below a predetermined level.

Further objects, features, aspects, benefits, and advantages of the present invention will become apparent from the description and drawings provided herewith.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

The present invention is directed to the lean burn operation of an internal combustion engine. One aspect of lean burn operation is the capability to better regulate harmful exhaust emissions such as nitrogen oxides (NOx).

Figure 1:
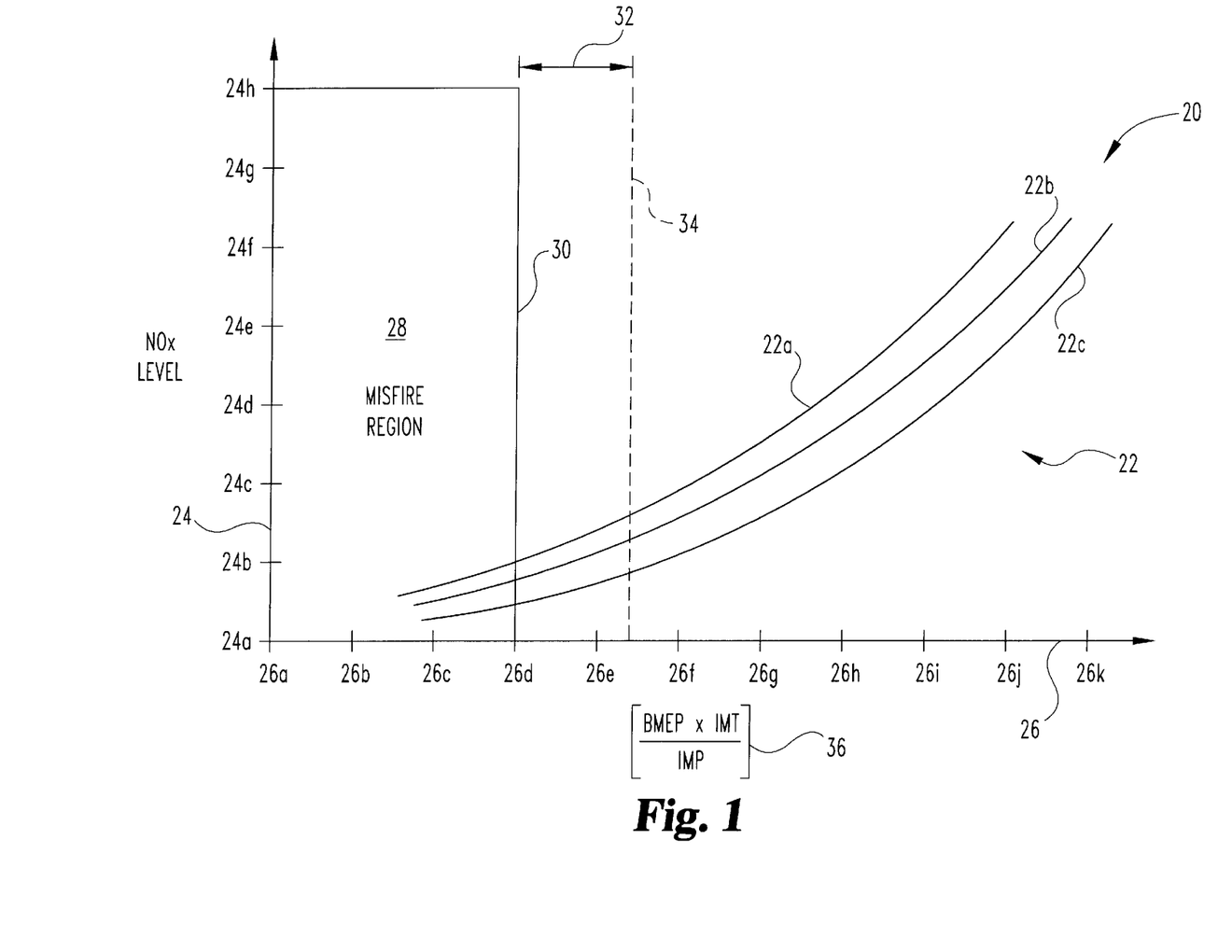
FIG. 1 is a graphical representation of an engine characteristic utilized by the present invention.
Figure 2:
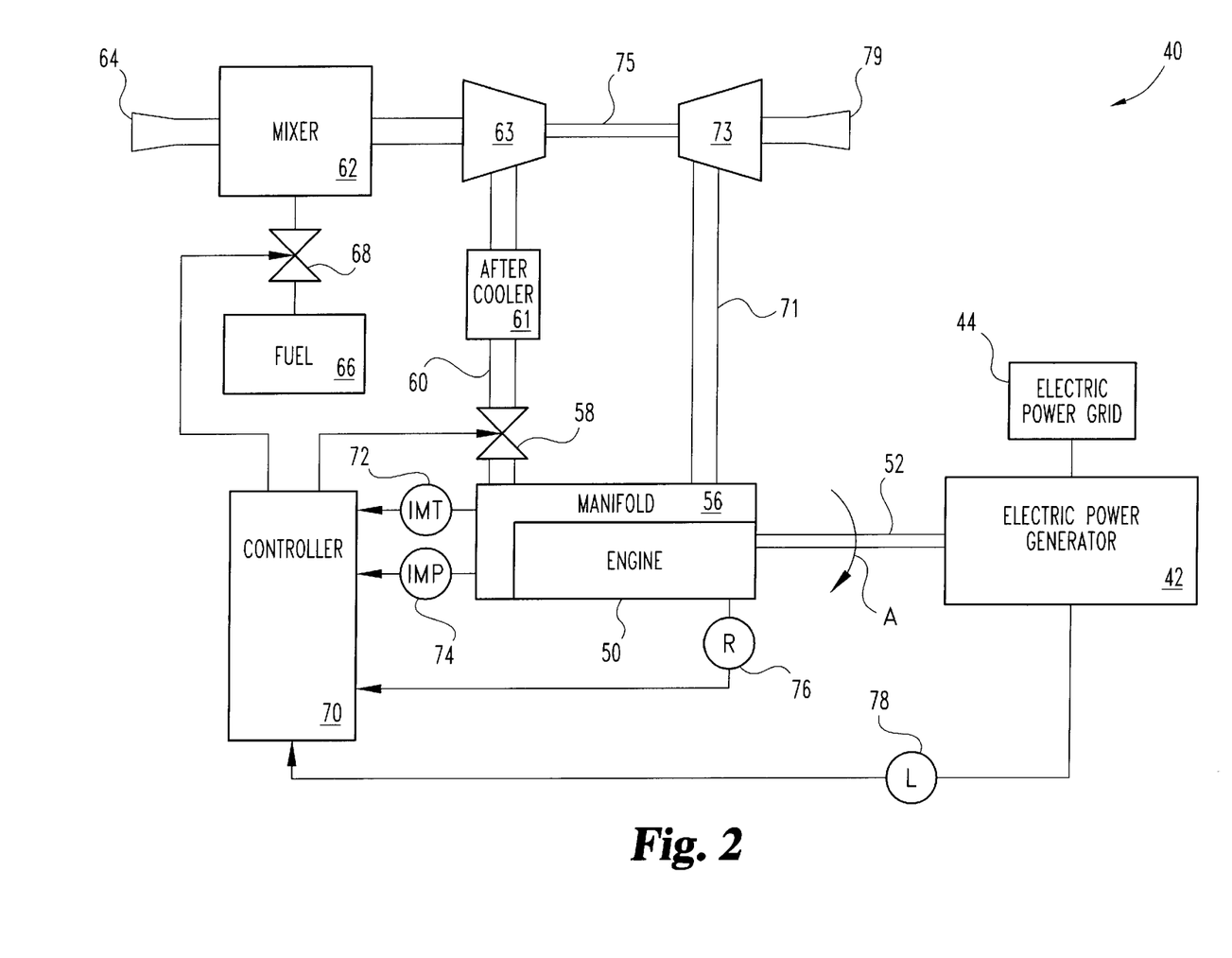
FIG. 2 is a schematic diagram of an electric power generation system of the present invention.

Graph 20 of FIG. 2 depicts performance relationship 22 for a spark ignition (SI) internal combustion engine. Generally, relationship 22 describes NOx emissions of the engine in terms of selected engine parameters. Relationship 22 is exemplified by curves 22a, 22b, 22c which each correspond to a different crankshaft rotational speed range of the SI engine. Vertical axis 24 of graph 20 represents the NOx emission rate as it increases from mark 24a through mark 24h. Horizontal axis 26 of graph 20 represents increasing values for the expression: ((BMEP×IMT)/IMP) from mark 26a through mark 26k; where, BMEP=Brake Mean Effective Pressure, IMT=Intake Manifold Temperature, and IMP=Intake Manifold Pressure.

The expression ((BMEP×IMT)/IMP) is alternatively referred to as Engine Control Characteristic (ECC) 36. The Brake Mean Effective Pressure (BMEP) is typically defined as the theoretical constant pressure exerted during each power stroke of the engine to produce brake horsepower. Brake Horsepower (BHP), alternatively called shaft horsepower, is generally defined as the indicated horsepower of an engine less the horsepower spent to: (1) overcome friction of the mechanical parts of the engine, (2) induct a fuel/air charge into the engine, and (3) exhaust combustion products from the engine. BMEP, BHP, and brake torque (Tb) may be related as follows: BMEP=($c_1$×(BHP/(D×n)))= ($c_2$×(Tb/D)); where, D=total piston displacement of the engine (generally a known constant), n=engine rotational speed, Tb=brake torque, and $c_1$, $c_2$ are constants.

It should be understood that brake torque (Tb) directly corresponds to Brake Horsepower (BHP) and Brake Mean Effective Pressure (BMEP). As a result, Tb may be operatively substituted for BMEP in ECC 36 by adjusting with an appropriate constant factor. Also, a control characteristic corresponding to ECC 36 may be determined by substituting for one or more of the variables BMEP, IMT, IMP in accordance with a known relationship to another variable. By way of non-limiting example, a relationship corresponding to ECC 36 may be determined from a mean effective pressure, torque, or power other than a "brake specific" value.

Graph 20 also depicts misfire region 28. At mark 26d, an upper boundary of misfire region 28, misfire threshold 30, is represented by a solid vertical line. Engine operation with an ECC 36 less than the value represented by mark 26d results in misfires and potential inoperability of the engine. A representative operating range 32 for ECC 36 is indicated on graph 20. Range 32 is bounded by misfire threshold 30 and a predetermined NOx emission rate limit 34, as represented by a dashed vertical line. For graph 20, the NOx emission varies for range 32 in accordance with the applicable curve 22a, 22b, 22c. ECC 36 may be maintained within range 32 by adjusting the air/fuel ratio of the fuel charge provided to the engine for combustion. Adjusting the relative proportion of air and fuel in the charge may be accomplished by changing the amount of air, the amount of fuel, or both.

In one example, a Cummins Engine Company COBRA test engine was operated at a rotational speed of between 1700 and 1900 Revolutions Per Minute (RPM) and instrumented to observe performance in accordance with relationship 22. It was determined that ECC 36 could be maintained with a +/−2.2% accuracy to reliably operate the engine with an emission rate between 0.5 and 1.0 g/(hp-hr) BSNOx (brake Specific NOx), where BSNOx corresponds to the emission rate in grams of NOx per hour for a given constant brake horsepower. This accuracy is feasible using monitoring techniques described in connection with FIGS. 2–5 hereinafter. Range 32 corresponds to the 2.2% accuracy window of this example when axis 24 is scaled so that BSNOx is 0.0 at mark 24a, and increases 0.5 g/hp-hr for each mark 24b, 24c, 24d, 24e, 24f, 24g, 24h, 24i to a value of 3.5 g/hp-hr at mark 24h; and horizontal axis 26 is scaled so that ECC 36 is set to 5.0 at mark 26a, and increases 0.2 for each mark 26b, 26c, 26d, 26e, 26f, 26g, 26h, 26i, 26j to a value of 7.0 at mark 26k.

Furthermore, relationship 22 of graph 20 was found to be relatively insensitive to changes in engine speed and IMT so that a ratio of BMEP and IMP may be used to provide comparable results. It has also been found that for a gaseous-fueled engine, relationship 22 is relatively insensitive to compositional changes typical of gaseous fuels. These gaseous fuels commonly include compressed natural gas, liquid natural gas, or a liquid petroleum gas. For example, relationship 22 has been found to be insensitive to methane number, density, and LHV variations common to natural gas.

FIG. 2 schematically depicts electric power generation system 40 which utilizes selected aspects of relationship 22 of graph 20 to control lean burn operation. System 40 includes electric power generator 42 which is operatively coupled to electric power grid 44. The speed of generator 42 is isochronously governed, such that the alternating current (A.C.) frequency of power grid 44 dictates the rotational speed of generator 42.

Generator 42 is driven by engine 50 via the rotation of shaft 52 as indicated by arrow A. Preferably, engine 50 is of an SI four-cycle variety configured with multiple reciprocating pistons coupled to a crankshaft which turns shaft 52. It is also preferred that engine 50 be fueled by a gaseous fuel. Engine 50 includes intake manifold 56 which is coupled to throttle 58 via conduit 60. Throttle 58 meters the flow of an air and fuel mixture, a fuel charge, through conduit 60 to manifold 56. Engine 50 includes valves (not shown) to selectively induct the fuel charge from the intake manifold 56 into combustion chambers (not shown) for subsequent ignition through a conventional four stroke engine process. Similarly, exhaust gases exit engine 50 in a standard manner through conduit 71. Throttle 58 is preferably a conventional butterfly valve suitable to deliver a gaseous fuel charge to an engine having an open chamber configuration.

The fuel charge delivered to engine 50 via throttle 58 is pressurized through a turbocharging process. After cooler 61 is located upstream from throttle 58 along conduit 60 to remove heat from the fuel charge to enhance combustion efficiency. Preferably, after cooler 61 is of a conventional type utilized for gaseous-fueled engines.

Mixer 62 mixes fuel and air to form the fuel charge for combustion by engine 50. Mixer 62 receives fuel from fuel source 66 as metered by controllable valve 68. Fuel source 66 includes the necessary equipment needed to supply fuel to mixer 62 in a gaseous form. In one embodiment, fuel source 66 includes a natural gas pipeline coupled by appropriate apparatus to controllable valve 68. Mixer 62 receives external air through intake 64 for mixing with fuel from fuel source 66. Compressor 63 receives the mixture of fuel and air from mixer 62, compressing it for subsequent delivery through after cooler 61. Compressor 63 is driven by turbine 73 via shaft 75. Turbine 73 is rotated by exhaust exiting engine 50 via conduit 71. Exhaust leaves turbine 73 via conduit 79.

Controllable valve 68 and throttle 58 are operatively coupled to controller 70. Accordingly, controllable valve 68 and throttle 58 are responsive to signals from controller 70 to adjust fluid flow. In addition, controller 70 receives inputs from various detectors and sensors configured to provide information concerning the operation of engine 50 and generator 42. In response to this information, controller 70 directs the operation of throttle 58 and valve 68. Sensor 72 is provided to generate signal IMT corresponding to intake manifold temperature. Sensor 74 is provided to generate signal IMP corresponding to intake manifold pressure. Rotation detector 76 is configured to detect rotation of shaft 52 as signal R. Preferably, signal R provides conventional crank angle information about engine 50 which may be utilized to time operation of engine 50. Rotational engine speed, signal n, is determined from signal R. In one embodiment, signal R includes a series of pulses, the frequency of which is directly proportional to the rotational speed of engine 50. U.S. Pat. Nos. 5,165,271 to Stepper et al., 5,460,134 to Ott et al., and 5,469,823 to Ott et al. are representative of arrangements suitable for providing signals R and n.

Electrical load detector 78 reports signal L corresponding to the electrical load or electric power output of generator 42. Typically, load detector 78 determines electrical power from voltage, current, and phase angle of the output of generator 42. It should be appreciated that output power of a rotating member may be determined as the product of rotational speed of the member and torque acting on the member. As a result, for an internal combustion engine, the expression: (BHP=n×Tb) applies. Notably, because generator 42 is driven by shaft 52, the load or power output of generator 42 indicated by electrical load detector 78 directly corresponds to the brake torque, Tb, for a given speed. Generally, the power output of generator 42 and engine 50 (and correspondingly the brake torque, Tb) differ only as a function of the power conversion efficiency of generator 42. For a given configuration, generator efficiency is typically determined by a known "percent efficiency versus load" curve or table. As a result, signal L may be used to determine Tb and BMEP, given signal n and values representative of total piston displacement D and generator efficiency.

Figure 3:
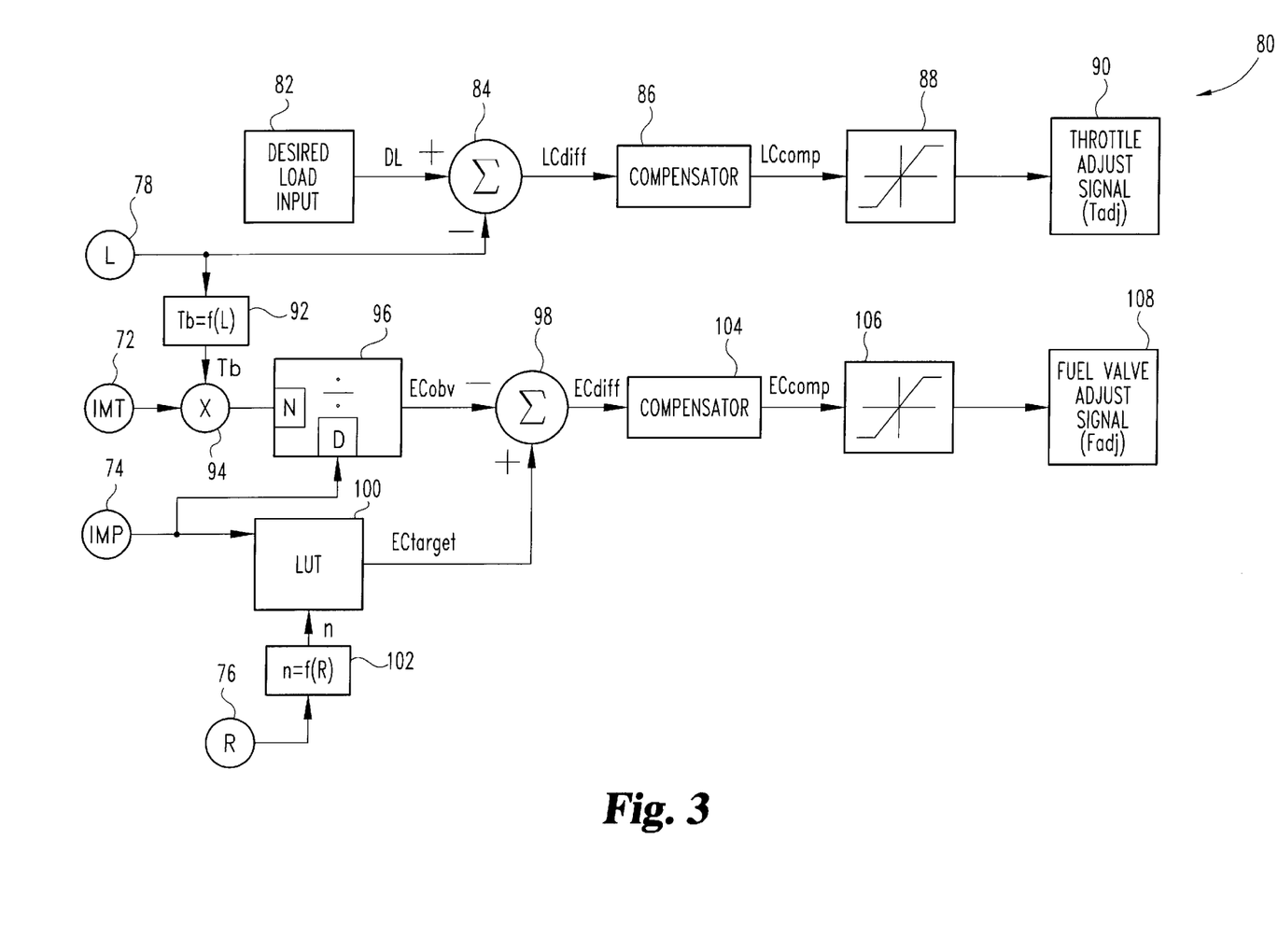
FIG. 3 is a signal flow diagram detailing selected operations of the system of FIG. 2.

Referring additionally to control process 80 of FIG. 3, selected operations of controller 70 are further described. In process 80, operators 82, 84, 86, 88, 90, and associated signals, provide a load control loop for generator 42. Input 82 provides desired load signal DL. Input 82 may originate within controller 70, be externally communicated to system 40 by an operator-controlled device (not shown), or through such other technique known to those skilled in the art. Signal DL is provided as a positive input to summation operator 84. The measured or observed load signal L from electrical load detector 78 is also input to summation operator 84 as a negative input to generate the difference between DL and L as signal LCdiff at the output, (LCdiff=DL−L).

Signal LCdiff is input to compensator 86. Compensator 86 is configured to filter transients in signal LCdiff that may lead to unstable operation. The compensated output of compensator 86, signal LCcomp, is then input to limiter 88 which limits the range of signal LCcomp to guard against instability due to equipment failure. Limiter 88 outputs throttle adjust signal, Tadj, indicated by output 90 of controller 70. Throttle 58 is configured to respond to signal Tadj from controller 70 to adjust fuel charge flow to intake manifold 56. As a result, power output of engine 50 changes, providing regulation of the load of generator 42.

Operators 92, 94, 96, 98, 100, 102, 104, 106, 108 of flow diagram 80, and associated signals, are configured to provide a control loop to regulate engine 50 near the lean burn misfire limit as a function of ((Tb×IMT)/IMP). Function operator 92 outputs the measured or observed brake torque, Tb, as a function of measured generator load signal L provided by electrical load detector 78 and rotational speed signal n derived from detector 76, such that: Tb=$f$(L). Function operator 92 accounts for generator efficiency, which may be determined by reference to an appropriate efficiency versus load characteristic. Typically, Tb differs from L by a constant factor. The output of operator 92, Tb, is provided as an input to multiplier 94 along with signal IMT from sensor 72. The output of multiplier 94 is provided to divider 96 as a numerator input (N). The denominator input (D) of divider 96 is provided from sensor 74 as signal IMP. The output signal of divider 96, ECobv, corresponds to the measured product of Tb and IMT, (Tb*IMT), divided by measured IMP. Signal ECobv is provided as a negative input to summation operator 98.

Summation operator 98 also receives a positive input from Look-Up Table (LUT) 100, signal ECtarget. The output of LUT 100 is selected based on signal IMP and signal n inputs. Function operator 102 receives the measured or observed rotation signal R as input from detector 76 and derives a corresponding rotational speed n therefrom in accordance with n=$f$(R).

LUT 100 provides a map of values for ECtarget which each correspond to a desired ((Tb×IMT)/IMP) for given inputs n and IMP. These values may be selected in accordance with relationship 22 of graph 20 by accounting for the total piston displacement constant D (BMEP=Tb/D). Signal n facilitates selection of an appropriate group of values corresponding to one of curves 22a, 22b, 22c. Signal IMP is employed to better determine an appropriate operating point value for ((Tb×IMT)/IMP) from the selected group to minimize NOx emissions without misfires. Preferably, this operating point corresponds to a range (such as range 32 of graph 20) which accounts for the expected measurement tolerances of Tb, IMT, and IMP. The difference between the observed and target engine control criteria, represented by signals ECobv and ECtarget, respectively, is output by summation operator 98 as signal ECdiff (ECdiff=ECtarget−ECobv).

Signal ECdiff is input to compensator 104 to filter out transients, and provide a filtered response to assure consistent jitter-free operation. Preferably, compensator 104 is set to provide a slower response compared to compensator 86 to give load regulation precedence over lean burn regulation. Indeed, load regulation response time is preferably as fast as possible while still maintaining stable operation, whereas compensator 104 may include a lag filter with a time constant on the order of several seconds. The output of compensator 104 is provided as signal ECcomp which is then input to limiter 106 to guard against extremes indicative of equipment failure. The output of limiter 106 is fuel valve adjustment signal Fadj indicated by output 108 of controller 70.

Controllable value 68 responds to signal Fadj from controller 70 to adjust fuel flow to mixer 62, which changes the air/fuel ratio of the fuel charge delivered to engine 50. Correspondingly, Fadj brings signed ECobv closer to ECtarget to control engine operation near the lean burn misfire limit as a function of Tb, IMT, IMP, and n. In an alternative embodiment of process 80, a constant is used to approximate signal n in correspondence with the isochronous operation of generator 42.

Figure 4:
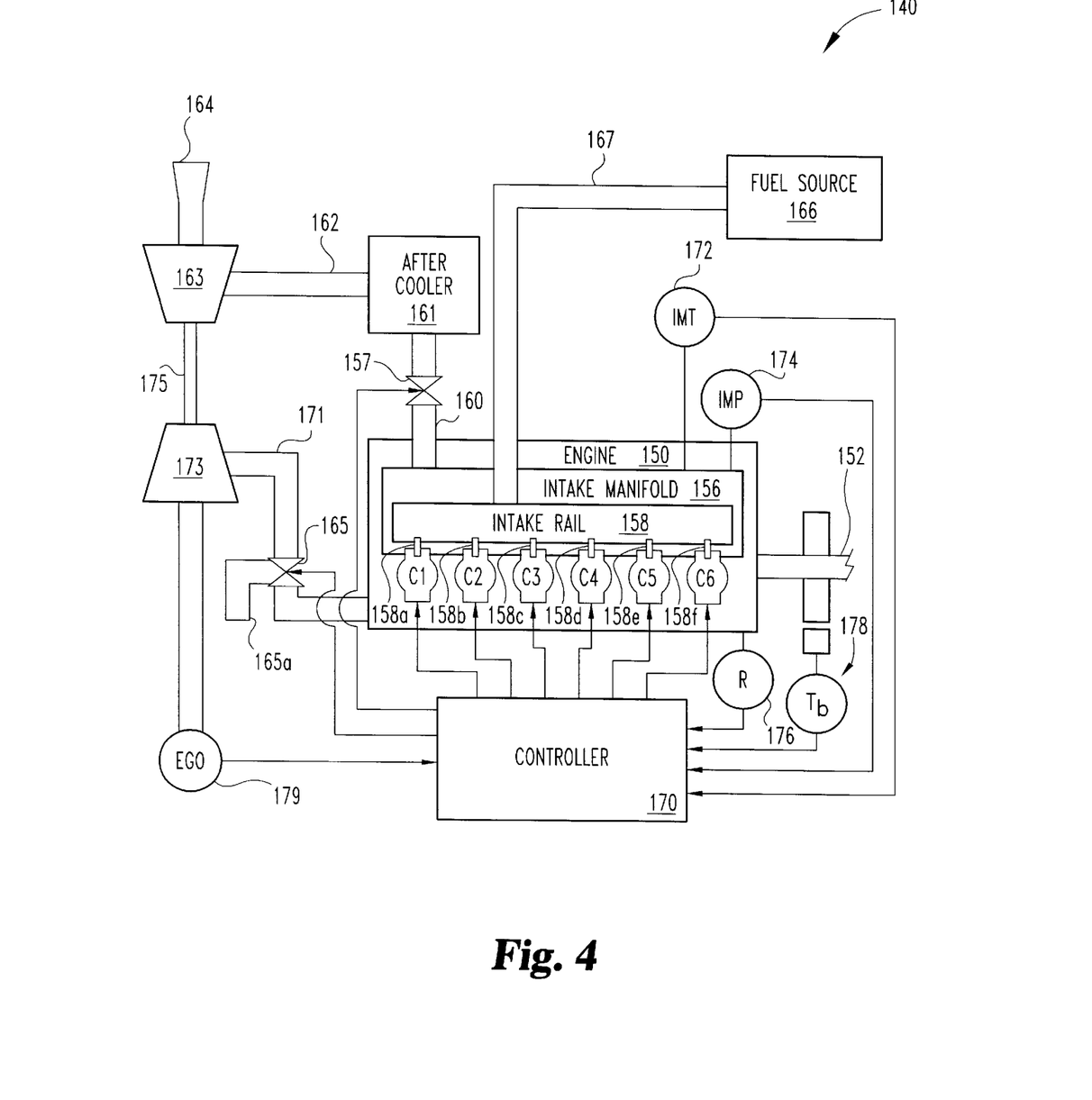
FIG. 4 is a schematic diagram illustrating an internal combustion engine system of the present invention.

FIG. 4 schematically depicts engine system 140 of another embodiment of the present invention. System 140 includes engine 150 with output shaft 152 (partial view). Engine 150 and shaft 152 may be configured to drive an electrical power generator, power a vehicle, or provide mechanical power for such other applications as would occur to those skilled in the art.

Engine 150 has reciprocating cylinders in combustion chambers C1–C6 which are schematically illustrated in FIG. 4. Chambers C1–C6 are coupled to intake manifold 156 by suitable valves (not shown) to receive air for mixing with fuel port injected from injection rail 158. Injection rail 158 is in fluid communication with controllable fuel injectors 158a–158f which each correspond to one of chambers C1–C6. Manifold 156, rail 158, and each corresponding injector 158a–158f are configured to provide a controlled, combustible mixture of fuel and air to each combustion chamber C1–C6 through a conventional port injection arrangement.

Intake manifold 156 receives pressurized air from conduit 160 which is metered by throttle 157. Throttle 157 is preferably of a conventional butterfly variety. Upstream of throttle 157 along conduit 160 is after cooler 161. After cooler 161 removes heat in a conventional fashion from pressurized air supplied by compressor 163 via conduit 162. Conduit 171 also includes controllable wastegate 165. Compressor 163 is driven by turbine 173 via shaft 175. Turbine 173 is driven by exhaust gases from engine 150 via conduit 171. Compressor 163, turbine 173, and shaft 175 may be configured as a conventional turbocharging arrangement. Controllable wastegate 165 is configured to selectively bleed exhaust gases upstream of turbine 173 for discharge through outlet 165a. Wastegate 165 may be activated to slow compressor 163 and correspondingly change air flow rate to engine 150.

Fuel source 166 supplies fuel to injector rail 158 for subsequent port injection into chambers C1–C6 through injectors 158a–158f, respectively. Fuel source 166 includes components necessary to conventionally supply fuel to injector rail 158 for subsequent injection by injectors 158a–158f. Preferably, fuel supplied by fuel source 166 is of a gaseous variety.

Throttle valve 158, wastegate 165, and injectors 158a–158b are operatively coupled to controller 170 which directs the operation thereof. Controller 170 is also coupled to temperature sensor 172 to generate signal IMT corresponding to intake manifold temperature and sensor 174 to generate signal IMP corresponding to intake manifold pressure.

Controller 170 is further coupled to rotation detector 176 which may be of a conventional variety that is arranged to provide a rotational speed signal n as described in connection with detector 76 of system 40. Sensor 178 is associated with a flywheel along shaft 152 to determine brake torque or "shaft torque" of engine 150 which is designated as signal Tb. U.S. Pat. No. 3,984,701 to Pieper discloses a torque meter which may be adapted for use with the present invention. Controller 170 is also operatively coupled to an Exhaust Gas Oxygen (EGO) sensor 179 which may be provided for control purposes other than the primary control of lean burn operation of engine 150. For example, oxygen sensor 179 may be used as a back-up in the event that sensor 178 fails.

Figure 5:
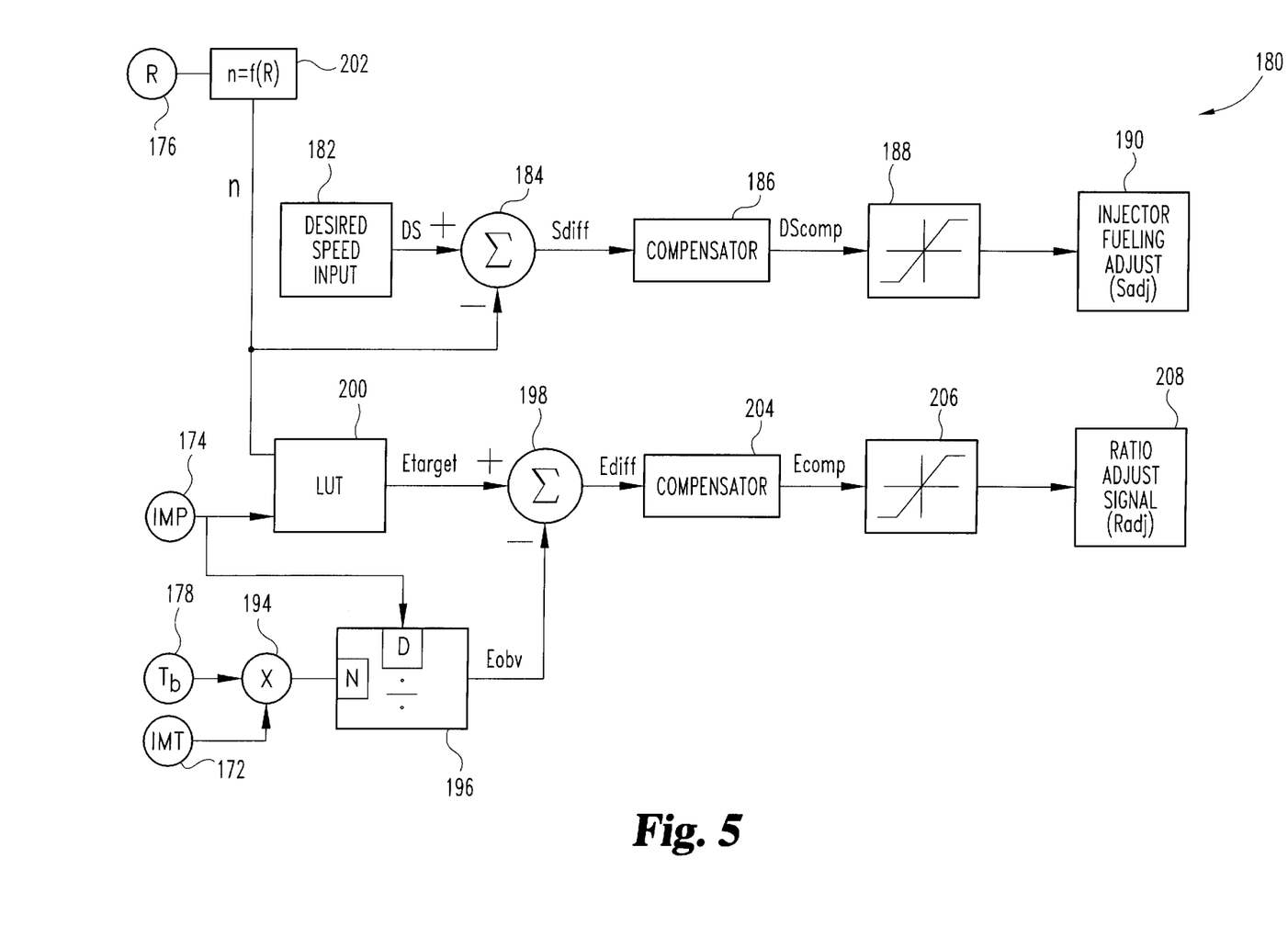
FIG. 5 is a signal flow diagram detailing selected operations of the system of FIG. 4.

Referring additionally to FIG. 5, selected operations of controller 170 are depicted in control process 180. Operators 182, 184, 186, 188, 190, and accompanying signals of process 180, provide a control loop for governing rotational speed of shaft 152. Input 182 provides a selected speed designated as signal DS. Signal DS is provided as a positive input to summation operator 174. Signal DS may be provided from a source remote to system 140 or from within controller 170. In a vehicle application, signal DS may be derived from an accelerator or similar operator-controlled device. In another embodiment, system 140 may be used to drive a stand-alone electric power generator with DS corresponding to generator output frequency.

A negative input is provided to summation operator 184 as signal n, which is representative of rotational speed of engine 150. Signal n is output by function operator 202 which receives signal R from detector 176 then processes signal R in accordance with $n=f(R)$ in a manner similar to operator 102 of process 80. The output of summation operator 184 is signal Sdiff, and represents the difference between the desired speed signal DS and the measured speed signal n (Sdiff=DS−n).

Signal Sdiff is input to compensator 186 which filters out Sdiff transients to provide for more stable operation. The output of compensator 186 is signal DScomp which is then input to limiter 188. Limiter 188 limits extremes of DScomp indicative of equipment failure. Output 190 of controller 170 provides signal Sadj. Signal Sadj is provided by controller 170 to injectors 158a–158f to adjust fueling and thereby regulate speed of engine 150.

The remaining operators and signals of process 180 are arranged to provide a feedback control loop for lean burn control of engine 150. Look-Up Table (LUT) 200 receives input signal n from function operator 202 and input signal IMP from sensor 174 to output a target emission control quantity as signal Etarget corresponding to ((Tb×IMT)/IMP). The values of Etarget are mapped to correspond to a selected lean burning range as described in connection with LUT 100 of process 80. Signal Etarget is provided as a positive input to summation operator 198.

Summation operator 198 also receives signal Eobv as a negative input. Signal Eobv is generated by divider 196 and represents the measured or observed value of ((Tb×IMT)/IMP). Divider 196 receives input signal IMP as denominator input (D) from sensor 174. The numerator input (N) to divider 196 is received from multiplier 194. In turn, multiplier 194 receives input signal Tb from detector 178 and signal IMT from sensor 172. The output of summation operator 198 is designated as signal Ediff and represents the difference between Etarget and Eobv (Ediff=Etarget−Eobv). Signal Ediff is input to compensator 204 which filters out transients and is arranged relative to compensator 186 to assure that speed regulation is given precedence over lean burn regulation. Compensator 204 may be implemented with a lag filter having a time constant on the order of several seconds.

The output of compensator 204 is signal Ecomp which is in turn input to limiter 206 to limit the absolute range of signal Ecomp. The output of limiter 206 is designated as ratio adjustment signal Radj as indicated by output 208 of controller 170. Signal Radj controls the air/fuel ratio input to engine 150 by adjusting air flow with throttle 158, wastegate 265, or both. In turn, lean burn operation is regulated.

In one alternative embodiment, combustion pressure sensors (not shown) are located within one or more engine combustion chambers C1–C6 to provide a signal from which Tb or BMEP can be derived instead of detector 78 or sensor 178. In other embodiments, one or more of Tb, IMT, or IMP are derived from another monitored engine characteristic through a known relationship in order to provide a control characteristic corresponding to ((Tb×IMT)/IMP).

Preferably, lean burn control is regulated in systems 40 and 140 as a function of Tb, IMP, IMT, and n. However, it has been found in some applications that the variation of ((Tb×IMT)/IMP) with signal IMT and/or signal n is negligible. Accordingly, in an alternative embodiment, lean burning control of an engine near the misfire limit is accomplished as a function of the ratio of Tb/IMP or BMEP/IMP without needing to account for engine speed or intake manifold temperature. For this embodiment, it is envisioned that one or more of Tb, BMEP, or IMP may be derived from another engine characteristic using a relationship known to those skilled in the art.

In another embodiment, the supply of air for mixture with fuel to provide a fuel charge does not rely on a compressor or other turbine driven device. Moreover, while one preferred embodiment drives an electric power generator, in other embodiments, different applications of an internal combustion engine controlled in accordance with the present invention are envisioned as would occur to one skilled in the art. Also, it should be understood, that the present invention applies to engines fueled by gaseous fuel, gasoline, or such other compositions as would occur to those skilled in the art.

Controller 70, 170 may be an electronic circuit comprised of one or more components. Controller 70, 170 may include digital circuitry, analog circuitry, or both. Also, controller 70, 170 may be programmable, an integrated state machine, or a hybrid combination thereof. Preferably each controller 70, 170 is a microprocessor-based controller of a known construction which is programmed with software to implement processes 80, 180, respectively, using techniques known to those skilled in the art.

All sensors and detectors of the present application may provide corresponding signals in a digital, analog, or such other format as would be compatible with associated equipment. Correspondingly, controller 70, 170 includes interfaces appropriate to condition and convert signals for the given format. All sentors and detectors described herein may be of a type known to those skilled in the art. Also, all valves, throttles, injectors, and other actuatable devices responsive to one or more signals from controller 70, 170 described herein may be of a type known to those skilled in the art.

It is contemplated that various operators, operations, stages, conditionals, procedures, thresholds, and processes described in connection with the present invention could be altered, rearranged, substituted, deleted, duplicated, combined, or added to other processes as would occur to those skilled in the art without departing from the spirit of the present invention.

All publications, patents, and patent applications cited in this specification are herein incorporated by reference as if each individual publication, patent, or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method, comprising:
   operating an internal combustion engine having an intake manifold;
   sensing a first characteristic corresponding to a mean effective pressure of the engine;
   sensing a second characteristic corresponding to fluid pressure in the intake manifold;
   sensing a third characteristic corresponding to fluid temperature in the intake manifold;
   establishing an engine performance criterion as a function of the first, second, and third characteristics;
   selecting a target for the performance criterion corresponding to lean burning operation of the engine with a limited emission rate of a pollutant; and
   controlling a mixture of air and fuel provided for combustion by the engine in accordance with the performance criterion and the target.

2. The method of claim 1, wherein the function corresponds to ((BMEP×IMT)/IMP) with BMEP representing brake mean effective pressure of the engine, IMT representing the fluid temperature in the intake manifold, and IMP representing the fluid pressure in the intake manifold.

3. The method of claim 1, wherein said controlling includes adjusting air/fuel ratio of the mixture to change the performance criterion relative to the target.

4. The method of claim 1, further comprising driving an electric power generator with the engine, and wherein said sensing of the first characteristic includes monitoring electrical load of the generator.

5. The method of claim 1, further comprising sensing a fourth characteristic corresponding to rotational speed of the engine and determining the engine performance criterion in accordance with the fourth characteristic.

6. The method of claim 1, further comprising mixing air and gaseous fuel to provide the mixture, and wherein said controlling includes adjusting flow rate of the gaseous fuel into the mixture and regulating flow rate of the mixture into the intake manifold of the engine.

7. A combination, comprising:
   an internal combustion engine having an intake manifold;
   a controllable valve coupled to said intake manifold, said valve being configured to adjust a mixture of air and fuel provided to said engine for combustion;
   a first sensor configured to generate a first signal corresponding to a torque produced by said engine;
   a second sensor configured to generate a second signal corresponding to an intake manifold pressure;
   a controller responsive to said first and second signals to generate:
      an observed engine performance signal as a function of a ratio of the torque and intake manifold pressure;
      a target engine performance signal representing a desired state of said observed performance signal and corresponding to a lean burn operating criterion of said engine;

a valve signal corresponding to a difference between said observed and target performance signals; and wherein said valve responds to said valve signal to control the mixture of air and fuel and correspondingly regulate lean burn operation of said engine.

8. The combination of claim 7, further comprising a third sensor configured to generate a third signal corresponding to intake manifold temperature, said observed performance signal being further determined in accordance with said third signal.

9. The combination of claim 7, further comprising:

a gaseous fuel source;

an air intake; and a mixer coupled to said gaseous fuel source and said air intake, said mixer being configured to provide the mixture of fuel and air to said intake manifold.

10. The combination of claim 9, wherein said valve is configured to adjust fuel flow from said fuel source to said mixer.

11. The combination of claim 7, wherein said valve is configured to adjust air flow to said intake manifold.

12. The combination of claim 7, further comprising an electric power generator configured to be driven by said engine.

13. The combination of claim 7, further comprising a throttle to adjust flow rate of the mixture.

14. A method of generating electricity, comprising:

driving an electric generator with an internal combustion engine;

sensing a characteristic of the generator corresponding to torque produced by the engine;

determining an engine performance criterion as a function of the characteristic from said sensing;

selecting a target for the engine performance criterion corresponding to a level of a pollutant emitted from the engine; and adjusting a combustible mixture of air and fuel provided to the engine in accordance with the performance criterion and the target to regulate emission of the pollutant.

15. The method of claim 14, wherein the characteristic includes electrical load of the generator.

16. The method of claim 14, further comprising sensing an engine speed, controlling flow of the mixture to the internal combustion engine in accordance with the engine speed.

17. The method of claim 14, wherein the generator is coupled to a power grid to maintain a rotational speed corresponding to frequency of the grid, said adjusting includes metering fuel into the mixture, and further comprising controlling power output of the engine by regulating flow rate of the mixture to the engine for combustion.

18. The method of claim 14, wherein the target is selected to maintain the engine performance characteristic between an engine misfire threshold and a pollutant emission rate limit.

19. The method of claim 14, wherein the engine includes an intake manifold configured to receive the mixture for combustion, and the performance criterion corresponds to ((Tb×IMT)/IMP) with Tb representing brake torque of the engine, IMT representing the fluid temperature in the intake manifold, and IMP representing the fluid pressure in the intake manifold.

20. The method of claim 19, further comprising sensing IMT, IMP, and engine speed, the performance criterion being further determined in accordance with the engine speed.

21. A power generation system, comprising:

an electric power generator;

an internal combustion engine configured to drive said generator;

a controllable fluid flow device configured to adjust an air/fuel mixture provided to said engine;

a monitoring device configured to generate a monitoring signal corresponding to electrical load of said generator;

a controller responsive to said monitoring device to determine an engine performance criterion as a function of said monitoring signal, said controller being configured to compare said engine performance criterion to a target criterion to generate a control signal, said target criterion corresponding to a desired lean burn operating state of said engine; and wherein said fluid flow device responds to said control signal to maintain the desired lean burn operating state by regulating the air/fuel mixture.

22. The system of claim 21, wherein said engine includes an intake manifold in fluid communication with a throttle operatively coupled to said controller, said controller is responsive to said monitoring device to generate a throttle signal, and said throttle is responsive to said throttle signal to control flow rate of the mixture into the intake manifold to regulate the load.

23. The system of claim 21, further comprising:

a gaseous fuel source;

an air intake; and a mixer coupled to said gaseous fuel source and said air intake, said mixer being configured to provide the air/fuel mixture to said engine.

24. The system of claim 23, wherein said fluid flow device is configured to meter fuel flow from said fuel source to said mixer.

25. The combination of claim 21, wherein said fluid flow device is configured to adjust air flow to said engine.

26. The system of claim 21, further comprising a power grid, said generator being operatively coupled to said grid to operate at a speed corresponding to a frequency of said grid, and wherein said engine includes an intake manifold coupled to a throttle, said throttle being configured to adjust flow rate of the mixture to said intake manifold, and power output of said engine is regulated by adjusting said throttle.

27. The system of claim 21, wherein said engine includes an intake manifold, and further comprising:

a first sensor configured to generate a first signal corresponding to intake manifold temperature;

a second sensor configured to generate a second signal corresponding to intake manifold pressure; and further wherein said controller determines said performance criterion in accordance with said first and second signals.

28. The system of claim 27, wherein said target criterion is determined by said controller from a look-up table of values.

29. A combination, comprising:

operating an internal combustion engine, the engine having an intake manifold;

establishing a control characteristic for the engine, the control characteristic corresponding to:

$$\frac{BMEP}{IMP}$$

wherein, BMEP represents brake mean effective pressure of the engine and IMP represents the fluid pressure in the intake manifold; and monitoring the control characteristic to regulate said operating as a function of a predetermined misfire threshold of the engine.

30. The combination of claim 29, further comprising:

sensing a first characteristic of the engine corresponding to BMEP; and sensing a second characteristic of the engine corresponding to IMP.

31. The combination of claim 29, wherein said operating includes supplying a mixture of gaseous fuel and air to the intake manifold.

32. The combination of claim 31, further comprising driving an electric power generator with the engine, and controlling electrical power output of the generator by adjusting flow rate of the mixture into the intake manifold.

33. The combination of claim 31, wherein said operating includes adjusting air/fuel ratio of the mixture.

34. The combination of claim 29, wherein said establishing includes determining the operating characteristic as a function of ((BMEP/IMP)×IMT), where IMT represents intake manifold temperature.

35. The combination of claim 29, wherein said operating includes selecting a target value for the operating characteristic and comparing the target value and the operating characteristic to adjust a combustible mixture of fuel and air supplied to the engine.

36. The combination of claim 29, further comprising determining BMEP from torque produced by the engine.

37. The combination of claim 29, further comprising driving an electric power generator with the engine, and determining BMEP from power output of the generator.

* * * * *